(12) United States Patent
Luo et al.

(10) Patent No.: US 9,609,522 B2
(45) Date of Patent: Mar. 28, 2017

(54) MULTI-CELL TRANSMISSIONS

(75) Inventors: Jijun Luo, Olching (DE); Ramakrishnan S, New Delhi (IN)

(73) Assignee: Nokia Solutions and Networks Oy, Espoo (FI)

(*) Notice: Subject to any disclaimer, the term of this patent is extended or adjusted under 35 U.S.C. 154(b) by 380 days.

(21) Appl. No.: 14/355,899

(22) PCT Filed: Nov. 3, 2011

(86) PCT No.: PCT/EP2011/069288
§ 371 (c)(1),
(2), (4) Date: Jul. 15, 2014

(87) PCT Pub. No.: WO2013/064184
PCT Pub. Date: May 10, 2013

(65) Prior Publication Data
US 2015/0146630 A1    May 28, 2015

(51) Int. Cl.
*H04W 16/14*  (2009.01)
*H04W 24/04*  (2009.01)
*H04W 88/08*  (2009.01)
*H04W 28/18*  (2009.01)

(52) U.S. Cl.
CPC ........... *H04W 16/14* (2013.01); *H04W 24/04* (2013.01); *H04W 28/18* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2009/0253435 A1* | 10/2009 | Olofsson | ........... | H04W 72/0406 455/450 |
| 2011/0211515 A1* | 9/2011 | Zeller | ................. | H04W 72/005 370/312 |
| 2012/0134314 A1* | 5/2012 | Zhang | ................. | H04W 72/005 370/312 |

FOREIGN PATENT DOCUMENTS

| | | | | |
|---|---|---|---|---|
| WO | WO 2007/149349 A2 | 12/2007 | | |
| WO | WO 2008/155764 A2 | 12/2008 | | |
| WO | WO 2010/019904 A1 | 2/2010 | | |
| WO | WO 2010/025286 A2 | 3/2010 | | |
| WO | WO 2010/130215 | * 11/2010 | ............. | H04W 4/00 |
| WO | WO 2011/020062 A2 | 2/2011 | | |
| WO | WO 2011/150250 A1 | 12/2011 | | |

OTHER PUBLICATIONS

3GPP TSG-RAN WG3 Meeting #Ad hoc, Sophia-Antipolis, France, Jun. 11-Jun. 12, 2008, R3-081642, "Consideration on MBSFN support", ZTE, 6 pgs.

(Continued)

*Primary Examiner* — Chi H Pham
*Assistant Examiner* — Ronald H Davis
(74) *Attorney, Agent, or Firm* — Harrington & Smith

(57) ABSTRACT

A technique including selecting as a coordinating entity one entity from a plurality of radio access network entities each capable of both coordinating a multi-cell transmission and following the coordination by another entity of a multi-cell transmission; deciding at said selected radio access network entity on physical parameters for a multi-cell transmission; and distributing physical parameter information about said multi-cell transmission from said coordinating entity to others of said plurality of radio access network entities.

9 Claims, 8 Drawing Sheets

(56) References Cited

OTHER PUBLICATIONS

3GPP TSG RAN Joint SA2/RAN2/RAN3 Meeting, St. Louis, US, Feb. 13-14, 2007, R3-070116, "MBMS reference architecture proposal", Ericsson, 4 pgs.
3GPP TSG RAN WG1 Meeting #54, Jeju, South Korea, Aug. 18-22, 2008, R1-082896, "Coordinated multi-cell transmission for LE-Advanced downlink", ETRI, 4 pgs.
3GPP TSG-RAN WG1 #59b, R1-100172, "Consideration on Feedback for Adaptive Cell Clustering", Hitachi Ltd., 6 pgs.
3GPP TS 36.300 V10.5.0 (Sep. 2011), "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", Section 15.1, 4 pgs.
Thiele, L, et al., "Scheduling-assisted joint processing fort CoMP in the framework of the WINNER+ project", 1 page, abstract only.

* cited by examiner

MULTI-CELL TRANSMISSIONS

A mobile telecommunication network comprising an array of cells can be used to provide mobile telecommunication services using multi-cell transmissions involving the simultaneous transmission of the same signal in a plurality of cells.

Examples of mobile telecommunication services include communication of voice, electronic mail (email), text messages, data, multimedia etc.

A mobile telecommunication network typically operates in accordance with a wireless standard. Examples include GSM (Global System for Mobile) EDGE (Enhanced Data for GSM Evolution) Radio Access Networks (GERAN), Universal Terrestrial Radio Access Networks (UTRAN), and evolved Universal Terrestrial Radio Access Networks (EUTRAN).

Such multi-cell transmissions involve the coordination of the plurality of cells.

One conventional approach involves implementing a coordinating function in a radio network access node closely associated with one or more of the cells involved in the multi-cell transmission.

There has been identified the challenge of achieving this coordination in a way that is less vulnerable to a failure at such a node and more accommodating of any subsequent requirement for more centralised coordination.

It is an aim of the present invention to meet this challenge.

There is hereby provided a method comprising: selecting as a coordinating entity one entity from a plurality of radio access network entities each capable of both coordinating a multi-cell transmission and following the coordination by another entity of a multi-cell transmission; deciding at said selected radio access network entity on physical parameters for a multi-cell transmission; and distributing physical parameter information about said multi-cell transmission from said coordinating entity to others of said plurality of radio access network entities.

In one embodiment, the method further comprises: in the event of a failure of said one entity selected as said coordinating entity, selecting another of said plurality of radio access network entities as a new coordinating entity, and distributing physical parameter information about a further multi-cell transmission from said new coordinating entity to others of said plurality of radio access network entities.

In one embodiment, said distributing comprises providing said physical parameter information to at least one of said plurality of radio access network entities via one or more of said plurality of radio access network entities.

In one embodiment, said another entity is an entity that is not capable of following the coordination by another entity of a multi-cell transmission.

In one embodiment, said another entity is a coordinating entity located at a mobile management entity or a coordinating entity located at an entity other than a mobile management entity or eNodeB.

In one embodiment, said plurality of radio access network entities comprise eNodeBs.

There is also provided a method comprising: receiving at a selected one of a plurality of radio access network entities, each capable of both coordinating a multi-cell transmission and following the coordination by another entity of a multi-cell transmission, an indication that said selected one radio access network entity is to operate as a coordinating entity; deciding at said selected radio access network entity on physical parameters for a multi-cell transmission; and distributing physical parameter information about said multi-cell transmission from said selected radio access network entity to others of said plurality of radio access network entities.

There is also provided a radio access network entity dynamically configurable between a first mode in which said entity coordinates a multi-cell transmission and a second mode in which said entity follows the coordination by another entity of a multi-cell transmission.

There is also provided an apparatus for use at a radio access network entity, said apparatus comprising: a processor and memory including computer program code, wherein the memory and computer program code are configured to, with the processor, cause the apparatus to: in response to an instruction from a management entity switch the radio access network entity between a first mode in which said radio access network entity coordinates a multi-cell transmission and a second mode in which said radio access network entity follows the coordination by another entity of a multi-cell transmission.

There is also provided a computer program product comprising program code means which when loaded into a computer controls the computer to: in response to an instruction from a management entity switch the radio access network entity between a first mode in which said radio access network entity coordinates a multi-cell transmission and a second mode in which said radio access network entity follows the coordination by another entity of a multi-cell transmission.

There is also provided a method comprising: selecting as a coordinating entity one of a plurality of radio access network entities, each capable of both coordinating a multi-cell transmission and following the coordination by another entity of a multi-cell transmission; sending to said selected entity an indication that said selected one radio access network entity is to operate as a coordinating entity; and sending to others of said plurality of radio access network entities an indication that said others are to follow the coordination by another of said plurality of radio access network entities.

There is also provided a management entity configured to select, as a coordinating entity, one entity from amongst a plurality of radio access network entities each capable of both coordinating a multi-cell transmission and following the coordination by another entity of a multi-cell transmission.

There is also provided an apparatus for use at a radio access network entity, said apparatus comprising: a processor and memory including computer program code, wherein the memory and computer program code are configured to, with the processor, cause the apparatus to: select, as a coordinating entity, one entity from amongst a plurality of radio access network entities each capable of both coordinating a multi-cell transmission and following the coordination by another entity of a multi-cell transmission.

There is also provided a computer program product comprising program code means which when loaded into a computer controls the computer to: select, as a coordinating entity, one entity from amongst a plurality of radio access network entities each capable of both coordinating a multi-cell transmission and following the coordination by another entity of a multi-cell transmission.

Embodiments of the invention are described in detail hereunder, with reference to the accompanying drawings, in which:—

Figure 1:
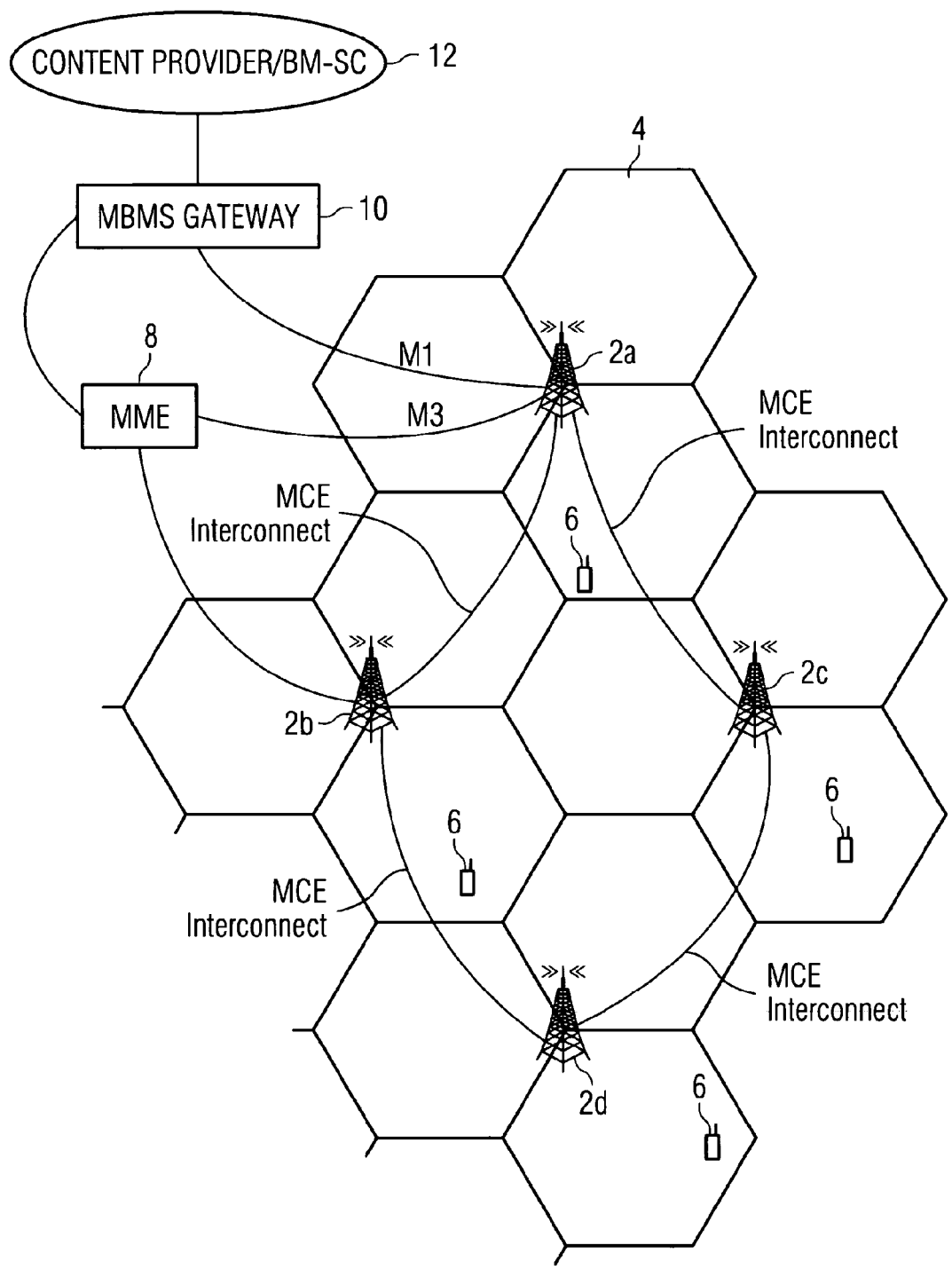
FIG. 1 illustrates a mobile telecommunication network configured for operation as Multicast Broadcast Multimedia Service Single Frequency Network (MBMS-SFN or MBSFN)
Figure 2:
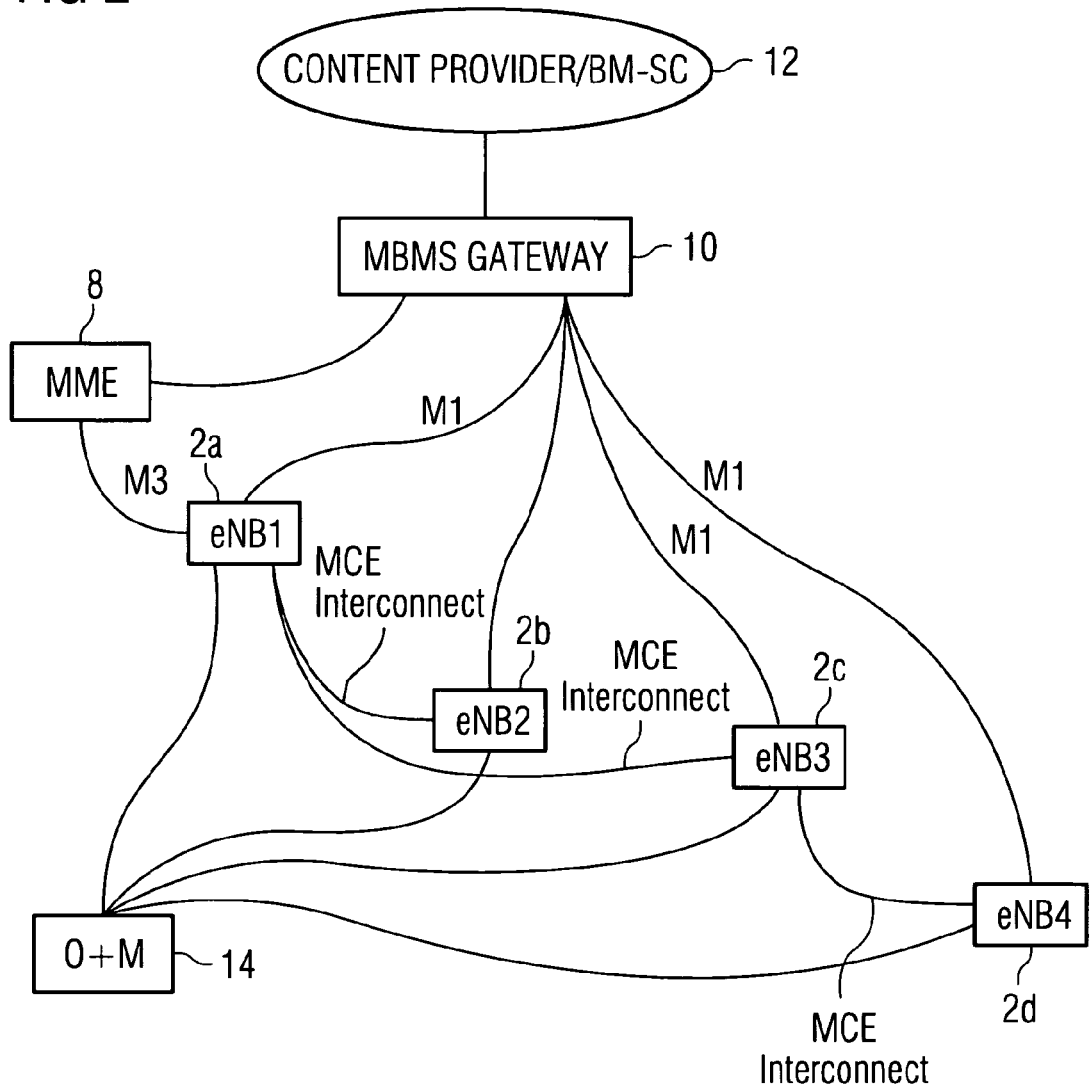
FIG. 2 illustrates the links between the nodes shown in FIG. 1 according to one configuration of the network.
Figure 3:
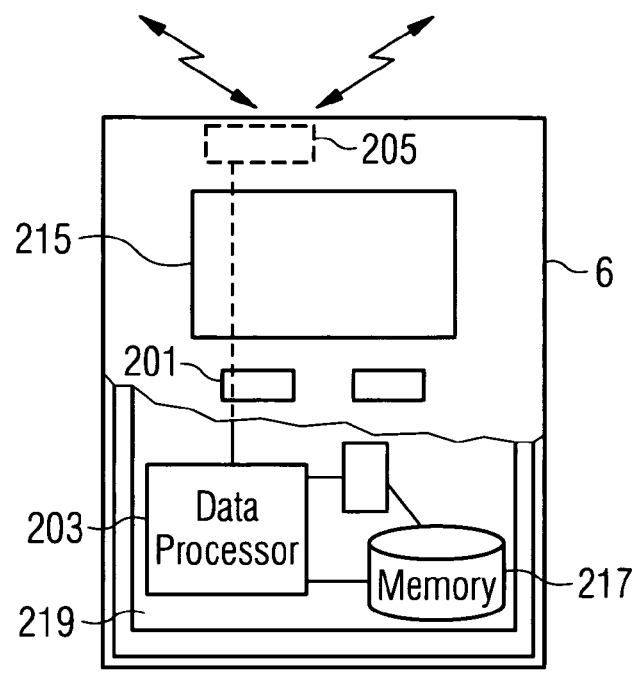
Figure 4:
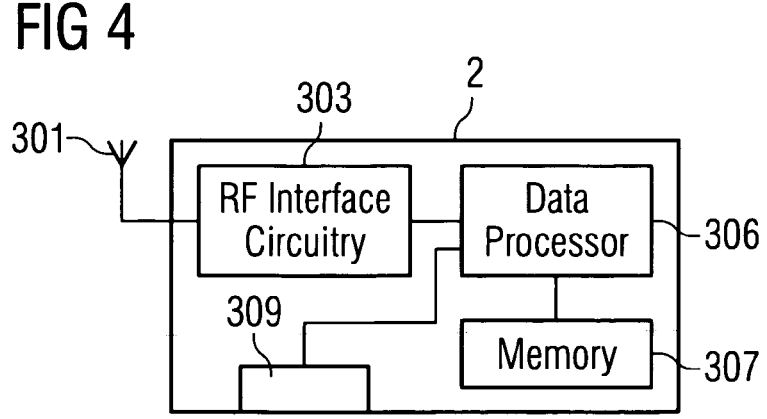
Figure 5:
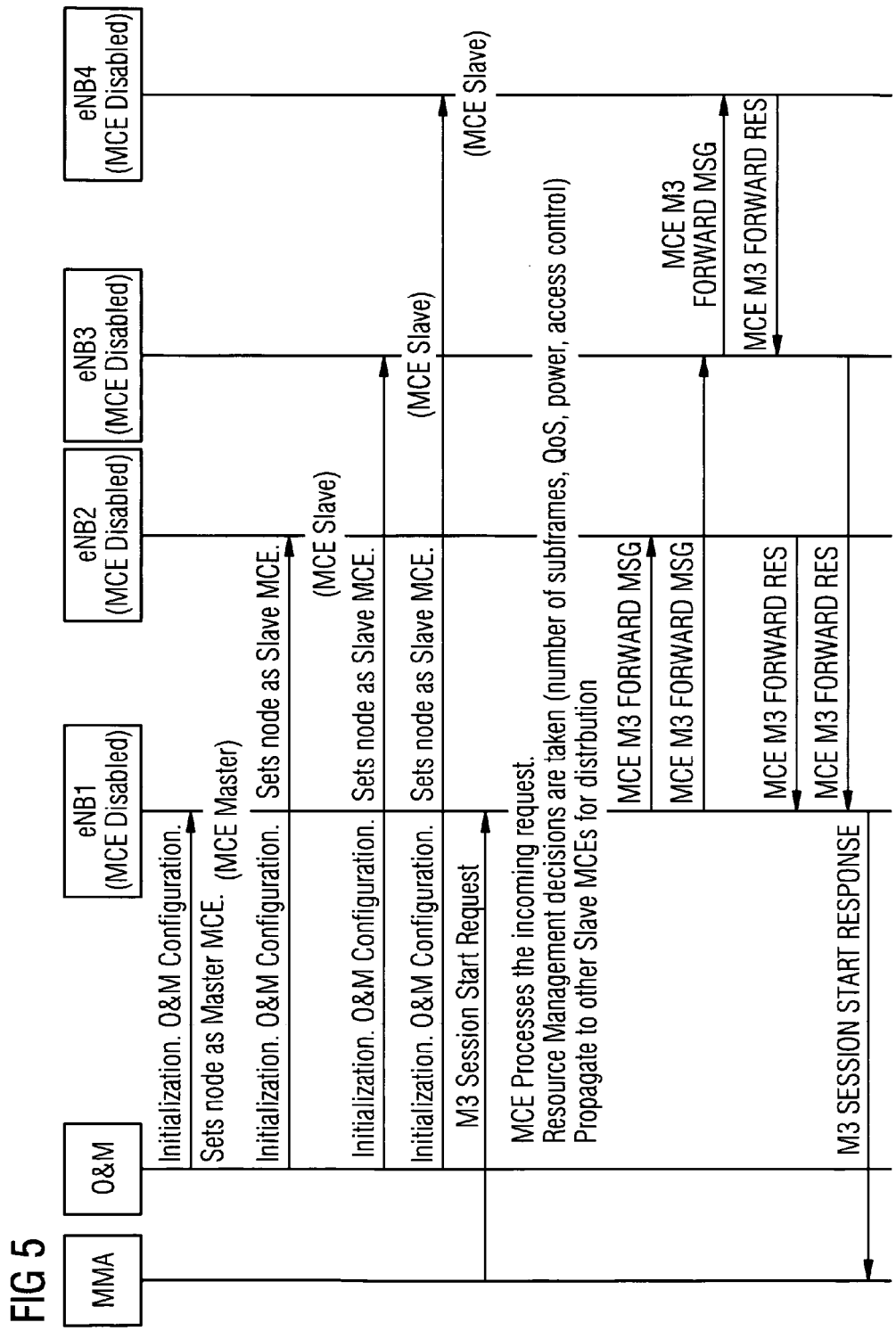
Figure 6:
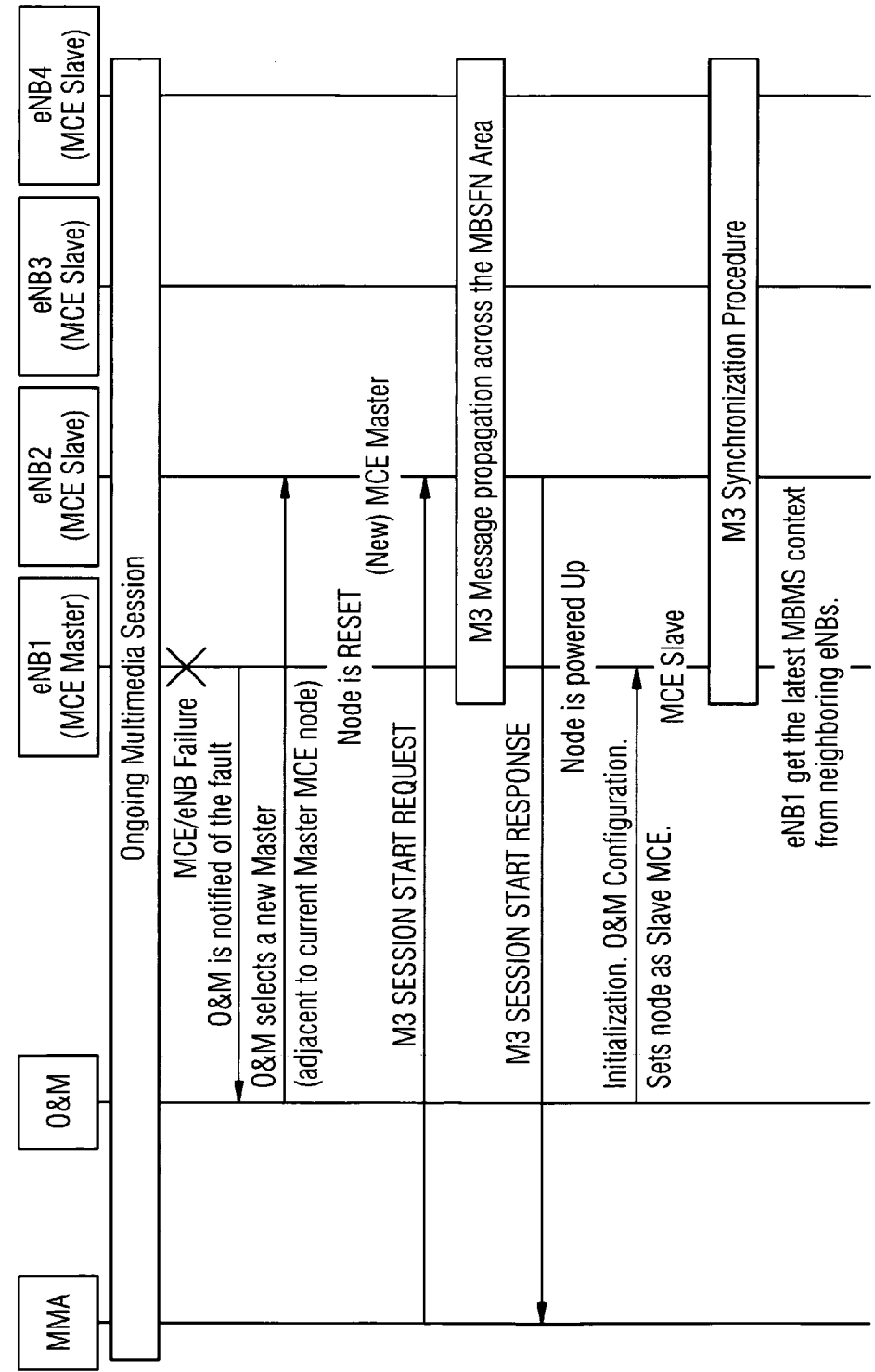
Figure 7:
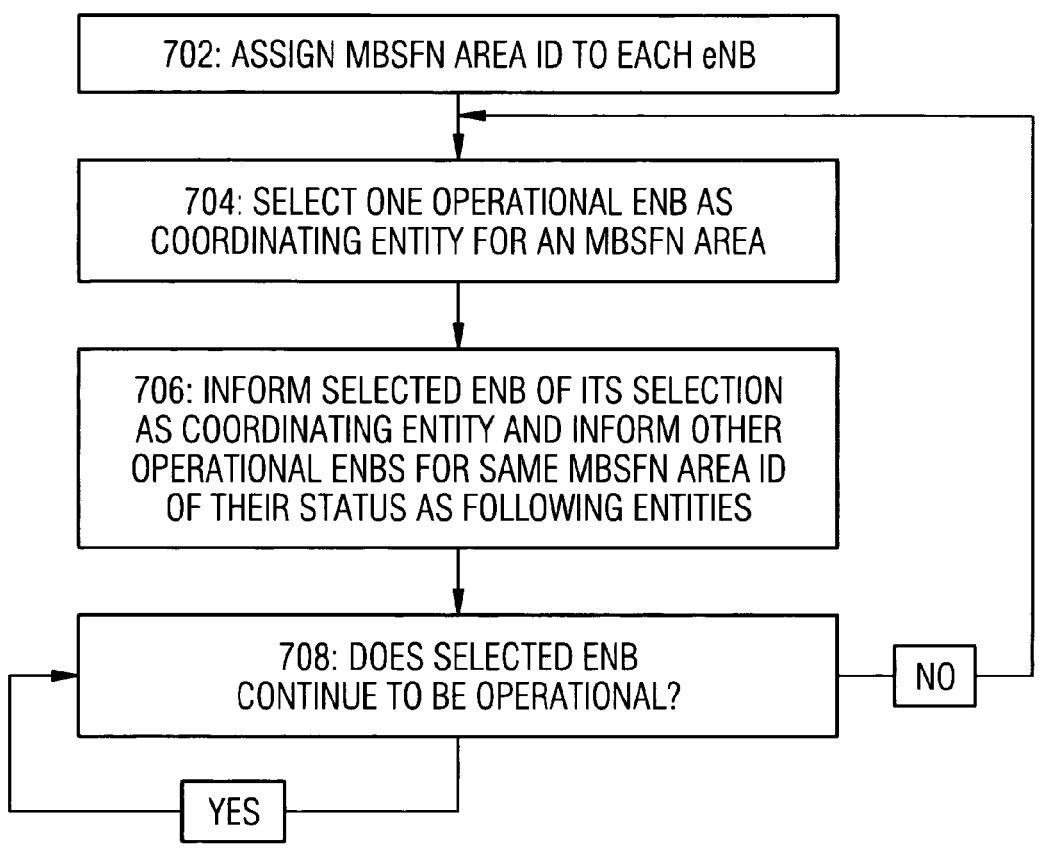
Figure 8:
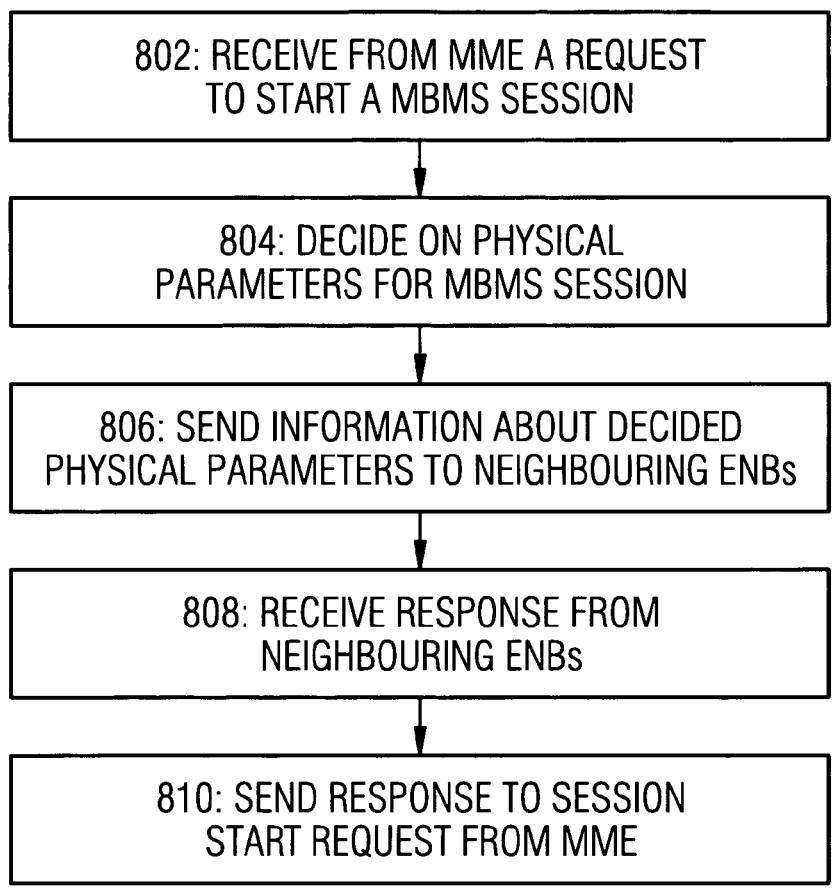
Figure 9:
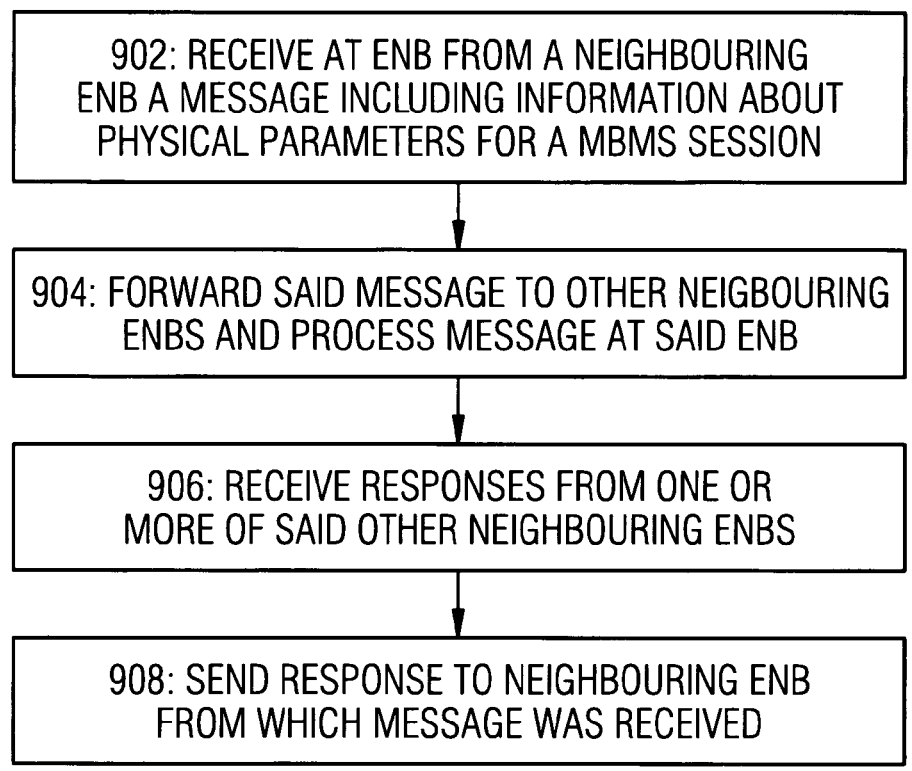

FIG. 3 schematically illustrates an example of an apparatus suitable for use at the eNodeBs of FIG. 1;

FIG. 4 schematically illustrates an example of an apparatus suitable for use at the user equipment of FIG. 1;

FIG. 5 illustrates an example of a message sequence flow for the configuration shown in FIG. 2;

FIG. 6 illustrates an example of a message sequence flow in the event of a temporary failure of the eNodeB selected as the MBMS coordinating entity;

FIG. 7 illustrates an example of operations at the Operations and Maintenance (O&M) unit of FIG. 2;

FIG. 8 illustrates an example of operations at the eNodeB selected as the MBMS coordinating entity; and FIG. 9 illustrates an example of operations at an eNodeB not selected as the MBMS coordinating entity.

An embodiment of the invention is described below, by way of example only, in the context of a mobile telecommunication network operating as a MBSFN (MBMS Single Frequency Network) in accordance with a 3GPP LTE standard. However, the same kind of techniques are also of use in other kinds of mobile telecommunication networks providing services by co-ordinated multi-cell transmissions.

FIG. 1 illustrates an example of a mobile telecommunication network (MTN) involving cells 4 served by eNodeBs (eNBs) 2a, 2b, 2c, 2d. Only twelve cells are shown in FIG. 1, but a mobile telecommunication network will typically comprise tens of thousands of cells.

Each eNB 2 is connected to its neighbouring eNBs and to a mobile management entity (MME) 8 of an evolved packet core (EPC). In the technique described below, these connections between the eNBs and the MCE are used to provide M3 control-plane links of the kind defined at Section 15.1 of 3GPP TS36.300 V10.5.0. Each eNB 2 is also connected to a MBMS gateway 10 (only one such connection is shown in FIG. 1, but all eNBs 2 are similarly connected to the MBMS gateway 10, which is itself connected to a content provider or Broadcast/Multicast Service Centre (BM-SC)). In the technique described below, these connections between the MBMS gateway and the eNBs are used to provide M1 user-plane links of the kind defined at Section 15.1 of 3GPP TS36.300 V10.5.0.

FIG. 2 illustrates the M3 link and other control plane links (as well as the M1 links) in an embodiment where eNB 2a is selected as a coordinating entity for a MBMS session. As shown in FIG. 2, each eNB 2 is also connected to an O&M unit 14. As discussed below, each of the four eNBs are capable of operating as a coordinating entity for a MBMS session, but only one eNB 2 is selected by O&M unit 14 as the coordinating entity and the other eNBs are instructed to follow the coordination of the eNB selected by the O&M unit 14 as the coordinating entity.

Each eNB can operate as a coordinating entity and receive control information over an M3 Link to the MME 8, and the other eNBs follow the coordination of the eNB selected as the coordinating entity. Each eNB 2 also includes an agent that interfaces via an internal M2 interface (of the kind defined at Section 15.1 of 3GPP TS36.300 V10.5.0) with the part of the eNB that receives control information via the M3 interface (in the case of the coordinating eNB) or an MCE Interconnect interface between it and the coordinating eNB (in the case of an eNB following the coordinating eNB).

FIG. 3 shows a schematic partially sectioned view of an example of user equipment 6 that may be used for receiving multi-cell transmissions from the MBSFN. The user equipment (UE) 6 may be used for various tasks such as making and receiving phone calls, for receiving and sending data from and to a data network and for experiencing, for example, multimedia or other content.

The UE 6 may be any device capable of at least receiving radio signals from the eNBs 2. Non-limiting examples include a mobile station (MS), a portable computer provided with a wireless interface card or other wireless interface facility, personal data assistant (PDA) provided with wireless communication capabilities, or any combinations of these or the like. The UE 6 may communicate via an appropriate radio interface arrangement of the UE 6. The interface arrangement may be provided for example by means of a radio part and associated antenna arrangement. The antenna arrangement may be arranged internally or externally to the UE 6.

The UE 6 may be provided with at least one data processing entity 203 and at least one memory or data storage entity 217 for use in tasks it is designed to perform. The data processor 213 and memory 217 may be provided on an appropriate circuit board 219 and/or in chipsets.

The user may control the operation of the UE 6 by means of a suitable user interface such as key pad 201, voice commands, touch sensitive screen or pad, combinations thereof or the like. A display 215, a speaker and a microphone may also be provided. Furthermore, the UE 6 may comprise appropriate connectors (either wired or wireless) to other devices and/or for connecting external accessories, for example hands-free equipment, thereto.

FIG. 4 shows an example of apparatus for use at the eNBs 2. The apparatus comprises a radio frequency antenna 301 configured to receive and transmit radio frequency signals; radio frequency interface circuitry 303 configured to interface the radio frequency signals received and transmitted by the antenna 301 and the data processor 306. The radio frequency interface circuitry 303 may also be known as a transceiver. The apparatus also comprises an interface 309 via which it can send and receive information to and from one or more other network nodes such as neighbouring eNBs 2, the MME 8, MBMS Gateway 10 and O&M entity 14. The data processor 306 is configured to process signals from the radio frequency interface circuitry 303, control the radio frequency interface circuitry 303 to generate suitable RF signals to communicate information to the UE 6 via the wireless communications link, and also to exchange information with other network nodes via the interface 309. The memory 307 is used for storing data, parameters and instructions for use by the data processor 306.

It would be appreciated that the apparatus shown in each of FIGS. 3 and 4 and described above may comprise further elements which are not directly involved with the embodiments of the invention described hereafter.

An embodiment of the present invention is next described with reference to the message sequence flow charts of FIGS. 5 and 6 and the operation flow charts of FIGS. 7 to 9.

Initialisation involves O&M unit 14 selecting one of the eNBs 2 (in this example, eNB1 2a) as a coordinating entity (MCE Master) (STEP 704 of FIG. 7). The O&M unit 14 informs eNB1 of its selection as MCE Master, and informs the other eNBs that they are to be following entities (MCE Slaves) (STEP 706 of FIG. 7).

eNB1 2a receives a request from MME 8 to start an MBMS session (M3 Session Start Request) (STEP 802 of FIG. 8). eNB1 decides on physical parameters (such as modulation and coding schemes (MCS) and time-frequency resources) for the MBMS session in the MBSFN area for which it is the coordinating entity (STEP 804 of FIG. 8). eNB1 sends to all its neighbouring eNBs (eNB2 and eNB3 in this example) a message including information about the physical parameters it has decided on for the multi-cell transmission (STEP 806 of FIG. 8); this message is referred to here as a "MCE Interconnect Forward" message. The MCE Interconnect Forward message also includes a transaction identifier (transaction Id) and a MBSFN Area Identifier (MBSFN Area Id), which are discussed below. Each eNB receiving this MCE Interconnect Forward message from eNB1 (STEP 902 of FIG. 9) forwards it on to each of its own neighbouring eNBs (such as eNB 4, in this example) (STEP 904 of FIG. 9). Each eNB receiving the MCE Interconnect message returns a MCE Interconnect Response message to the eNB from which it received the MCE Interconnect Forward message (STEP 906 of FIG. 9). Each eNB forwarding the MCE Interconnect Forward message allows a pre-configured length of time for MCE Interconnect Response messages back from the eNBs to which it forwarded the MCE Interconnect Forward message, before sending its own MCE Interconnect Response message back to the eNB from which it received a MCE Interconnect Forward message (STEP 908 of FIG. 9), which could be the MCE Master (eNB1 in this example) or an eNB between it and the MCE Master.

After receiving MCE Interconnect Response messages back from each of its neighbouring eNBs (to which it send MCE Interconnect Forward messages) (STEP 808 of FIG. 8), the coordinating eNB (eNB1) sends a M3 Session Start Response message to the MME 8 (STEP 810 of FIG. 8).

The MBSFN Area Id enables each eNB receiving the MCE Interconnect Forward message to determine whether or not the message is for the MBMS service area that it serves. Each eNB has been assigned a MBSFN Area Id by the O&M unit (STEP 702 of FIG. 7), and the eNB simply discards the message if the MBSFN Area Id indicated in the MCE Interconnect Forward message does not match the MBMS Area Id assigned to it by the O&M unit 14.

The transaction Id enables a following eNBs (MCE Slaves) to determine whether the MCE Interconnect Forward message relates to a MBMS session for which it has already received a MCE Interconnect Forward message (such as via another path from the coordinating eNB (MCE Master). Also, each eNB stores the most recently processed message received at the eNB via a MCE Interconnect link. This helps to achieve a controlled distribution of MCE Interconnect messages throughout the network of eNBs. If an eNB happens to receive via a MCE Interconnect link a message that is the same as the MCE Interconnect message most recently received (and stored) at that eNB, the eNB refrains from processing the same MCE Interconnect message or forwarding it on to neighbouring eNBs.

In the case an eNB does not receive within the above-mentioned pre-configured length of time a MCE Interconnect Response message from any eNB to which it has sent a MCE Interconnect Forward message, it assumes that that eNB is not in operation.

Any eNB which is not in operation at the time the MCE Interconnect Forward messages are being distributed amongst eNBs but comes into operation thereafter, can adopt the following procedure to update its MBMS context. While such an eNB is initializing after a Node Reset, the initializing eNB sends a request for MBMS context synchronisation to a neighbouring eNB specified in a list of neighbouring eNBs that it has. If the response from that neighbouring eNB is negative, the initializing eNB sends the same request message to the next eNB in its list of neighbouring eNBs, and so on until it receives the necessary context information to take part in the MBMS session.

In the event that the eNB selected by the O&M unit 14 as the coordinating entity (eNB1 in this example) experiences some failure, the O&M unit becomes notified of the failure (STEP 708 of FIG. 7) and selects a different, operational eNB as the new coordinating entity (MCE Master). The O&M unit 14 selects as the new coordinating entity one of the eNBs for the same MBSFN service area as the previous coordinating entity (eNB1). In the example illustrated in FIG. 6, the O&M unit selects eNB2 2b as the new coordinating entity and informs eNB2 2b accordingly. The new coordinating entity eNB2 2b creates a M3 link with the MME 8, and receives M3 messages from the MME 8 via such link. Upon receiving a request from MME 8 to start a MBMS session, the new coordinating entity eNB2 2b operates in the same way as described for eNB1 2a when eNB1 2a was the coordinating entity.

If the previous coordinating entity eNB1 2a is powered up again after its failure, the O&M unit 14 is notified of this and sends an indication to eNB12a that it is to operate as a following entity (MCE Slave). As part of its initialisation procedures, eNB1 2a follows the synchronisation procedure mentioned above to acquire the MBMS context information necessary for it to take part in any ongoing or new MBMS session.

In the event that the coordinating function for MBMS sessions in a MBMS service area is later implemented at the MME 8 or another relatively centralised entity between the MME 8 and the eNBs 2 (which coordinating function is referred to here as an external MCE) the O&M unit 14 informs all eNBs in that MBMS service area accordingly. All such eNBs switch into an idle mode, in which they ignore any received MCE Interconnect Forward message of the kind described above (i.e. they do not process the message or forward the message to any neighbouring eNBs), and instead follow the coordination of the external MCE.

In the example described above, each eNB is capable of functioning as a coordinating entity (MCE Master) or a following entity (MCE Slave) depending on the instruction from the O&M unit 14. According to one variation, only some of the eNBs have such dual functionality; and some eNBs only have M2 functionality (i.e. can only have an M2 interface and not an M3 interface) and are only capable of operating as following entities under the coordination via a M2 interface of whichever dual functionality eNB is selected as the coordinating entity (Master MCE) or under the coordination via a M2 interface of an external MCE.

According to one example, the coordinating entity (MCE Master) also takes the decision whether or not to proceed with an MBMS session in the MBSFN area to which it belongs, and thus additionally acts as an access-control unit for MBMS sessions.

Also, in the example described above, the coordinating entity (MCE Master) is selected by the O&M 14. However, one variation is to configure the eNBs 2 such that they themselves select one of their group as the coordinating entity based on the amount of unicast traffic at each eNB. The election procedure could, for example, be triggered by O&M 14 in response to the detection at O&M 14 of the failure of the existing MCE Master or the initialisation of an eNB. The election of the coordinating entity by the eNBs 2 themselves could, for example, be achieved by messaging on the MCE Interconnect links between the eNBs 2. The eNB triggered by O&M to initiate the election process sends a POLL REQUEST message to each of its neighbouring eNBs, which in turn forward the message onto to each of their own neighbouring eNBs and so on. Each eNB receiving this POLL REQUEST message replies with a POLL RESPONSE message including unicast traffic throughput information, and the initiating eNB sends a LEADER ELECT message to the eNB that it determines from the POLL RESPONSE messages to have the highest unicast traffic throughput. The eNB thus elected as the new coordinating entity then updates its MCE state and creates a M3 link to the MME 8. This election procedure could be used to select one of the eNBs as a coordinating entity (MCE Master) that both (i) decides whether or not to proceed with an MBMS session in the respective MBSFN area (Access Control), and (ii) decides on resources to be used for a MBMS session (Reconfiguration of MBMS Radio Resources).

Alternatively, the information about unicast traffic throughput obtained via this kind of polling is used by O&M 14 to elect one of the eNBs as the coordinating entity (MCE Master).

Alternatively, the coordinating entity (MCE Master) could be selected randomly, or according to a pre-determined rule such as one whereby the immediate neighbour of the existing MCE Master is selected as the new MCE Master in the event of a failure of the existing MCE Master. Information about unicast traffic throughput at the eNBs, in this case, could be polled periodically (with configurable periodicity) by MCE Master as per procedure defined above (i.e. using POLL_REQUEST/POLL_RESPONSE). This information about unicast throughput is used by MCE Master to take decisions on access control and also with respect to reconfiguration as mentioned above.

In the example described above, the above-mentioned dual functionality (i.e the capability to function either as a coordinating entity with a M3 link to the MME, or a following (slave) entity with a MCE Interconnect link to the coordinating entity) is implemented at a plurality of eNBs 2. However, according to one variation, the dual functionality is instead implemented at a plurality of entities separate to the eNBs 2 (hereafter referred to as separate M3 entities), each separate M3 entity associated with a plurality of eNBs via a M2 interface. The resources for a MBMS session is decided at the one of the plurality of separate M3 entities selected by the O&M unit 14 as the coordinating entity (MCE master), and the resource information for the MBMS session is distributed from the coordinating entity (MCE Master) among the other separate M3 entities (and from there to the respective set of eNBs associated therewith) in the same way as described above by means of MCE Interconnect Forward messages between the M3 entities.

The techniques described above provide the following advantages: (a) any failure at an eNB functioning as coordinating entity can be resolved by switching the coordinating function to another eNB, thereby reducing outage; (b) the resource information for a MBMS session can be distributed from the coordinating eNB to all following eNBs without the need for a direct connection between the coordinating eNB and all the following eNBs; and (c) the system is compatible with the introduction of an external MCE.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:
1. A method comprising:
selecting as a coordinating entity one entity from a plurality of radio access network entities each capable of both coordinating a multi-cell transmission and following the coordination by another entity of a multi-cell transmission;
deciding at said selected radio access network entity on physical parameters for a multi-cell transmission;
distributing physical parameter information about said multi-cell transmission from said coordinating entity to others of said plurality of radio access network entities;
in the event of a failure of said one entity selected as said coordinating entity, selecting another of said plurality of radio access network entities as a new coordinating entity; and
distributing physical parameter information about a further multi-cell transmission from said new coordinating entity to others of said plurality of radio access network entities.

2. A method according to claim 1, wherein said distributing comprises providing said physical parameter information to at least one of said plurality of radio access network entities via one or more of said plurality of radio access network entities.

3. A method according to claim 1, wherein said plurality of radio access network entities comprise eNodeBs.

4. A method comprising:
receiving at a selected one of a plurality of radio access network entities, each capable of both coordinating a multi-cell transmission and following the coordination by another entity of a multi-cell transmission, an indication that said selected one radio access network entity is to operate as a coordinating entity;

deciding at said selected radio access network entity on physical parameters for a multi-cell transmission;

distributing physical parameter information about said multi-cell transmission from said selected radio access network entity to others of said plurality of radio access network entities; and in the event of a failure at said selected one of said plurality of radio access network entities as said coordinating entity, following the coordination by another entity coordinating said multi-cell transmission.

5. An apparatus comprising:
a processor; and
a memory including computer program code, wherein the memory and computer program code are configured, with the processor, to cause the apparatus to:
in response to an instruction from a management entity, switch between a first mode, wherein said apparatus coordinates a multi-cell transmission, and a second mode, wherein said apparatus follows the coordination by another entity of a multi-cell transmission;
receive an indication to operate as a coordinating entity;
decide on physical parameters for a multi-cell transmission;
distribute physical parameter information about said multi-cell transmission to radio access network entities; and
in the event of a failure as said coordinating entity, follow the coordination by another entity coordinating said multi-cell transmission.

6. A computer program product comprising a non-transitory computer-readable storage medium bearing computer program code embodied therein for use with a computer, the computer program code comprising code for performing:
in response to an instruction from a management entity, switching between a first mode, wherein an apparatus coordinates a multi-cell transmission, and a second mode, wherein in which said apparatus follows the coordination by another entity of a multi-cell transmission;
receiving at the apparatus an indication to operate as a coordinating entity;
deciding on physical parameters for a multi-cell transmission;
distributing physical parameter information about said multi-cell transmission to radio access network entities; and
in the event of a failure as said coordinating entity, following the coordination by another entity coordinating said multi-cell transmission.

7. A method comprising:
selecting as a coordinating entity one of a plurality of radio access network entities, each capable of both coordinating a multi-cell transmission and following the coordination by another entity of a multi-cell transmission;
sending to said selected entity an indication that said selected one radio access network entity is to operate as a coordinating entity;

sending to others of said plurality of radio access network entities an indication that said others are to follow the coordination by another of said plurality of radio access network entities;

in the event of a failure of said one entity selected as said coordinating entity, selecting another of said plurality of radio access network entities as a new coordinating entity, and distributing physical parameter information about a further multi-cell transmission from said new coordinating entity to others of said plurality of radio access network entities.

8. An apparatus comprising:
a processor; and
a memory including computer program code, wherein the memory and computer program code are configured, with the processor, to cause the apparatus to:
select, as a coordinating entity, one entity from amongst a plurality of radio access network entities each capable of both coordinating a multi-cell transmission and following the coordination by another entity of a multi-cell transmission;
send to said selected entity an indication that said selected one radio access network entity is to operate as a coordinating entity;
send to others of said plurality of radio access network entities an indication that said others are to follow the coordination by another of said plurality of radio access network entities;
in the event of a failure of said one entity selected as said coordinating entity, select another of said plurality of radio access network entities as a new coordinating entity; and
distribute physical parameter information about a further multi-cell transmission from said new coordinating entity to others of said plurality of radio access network entities.

9. A computer program product comprising a non-transitory computer-readable storage medium bearing computer program code embodied therein for use with a computer, the computer program code comprising code for performing:
selecting, as a coordinating entity, one entity from amongst a plurality of radio access network entities each capable of both coordinating a multi-cell transmission and following the coordination by another entity of a multi-cell transmission;
sending to said selected entity an indication that said selected one radio access network entity is to operate as a coordinating entity;
sending to others of said plurality of radio access network entities an indication that said others are to follow the coordination by another of said plurality of radio access network entities;
in the event of a failure of said one entity selected as said coordinating entity, selecting another of said plurality of radio access network entities as a new coordinating entity; and
distributing physical parameter information about a further multi-cell transmission from said new coordinating entity to others of said plurality of radio access network entities.

* * * * *